United States Patent Office 3,526,684
Patented Sept. 1, 1970

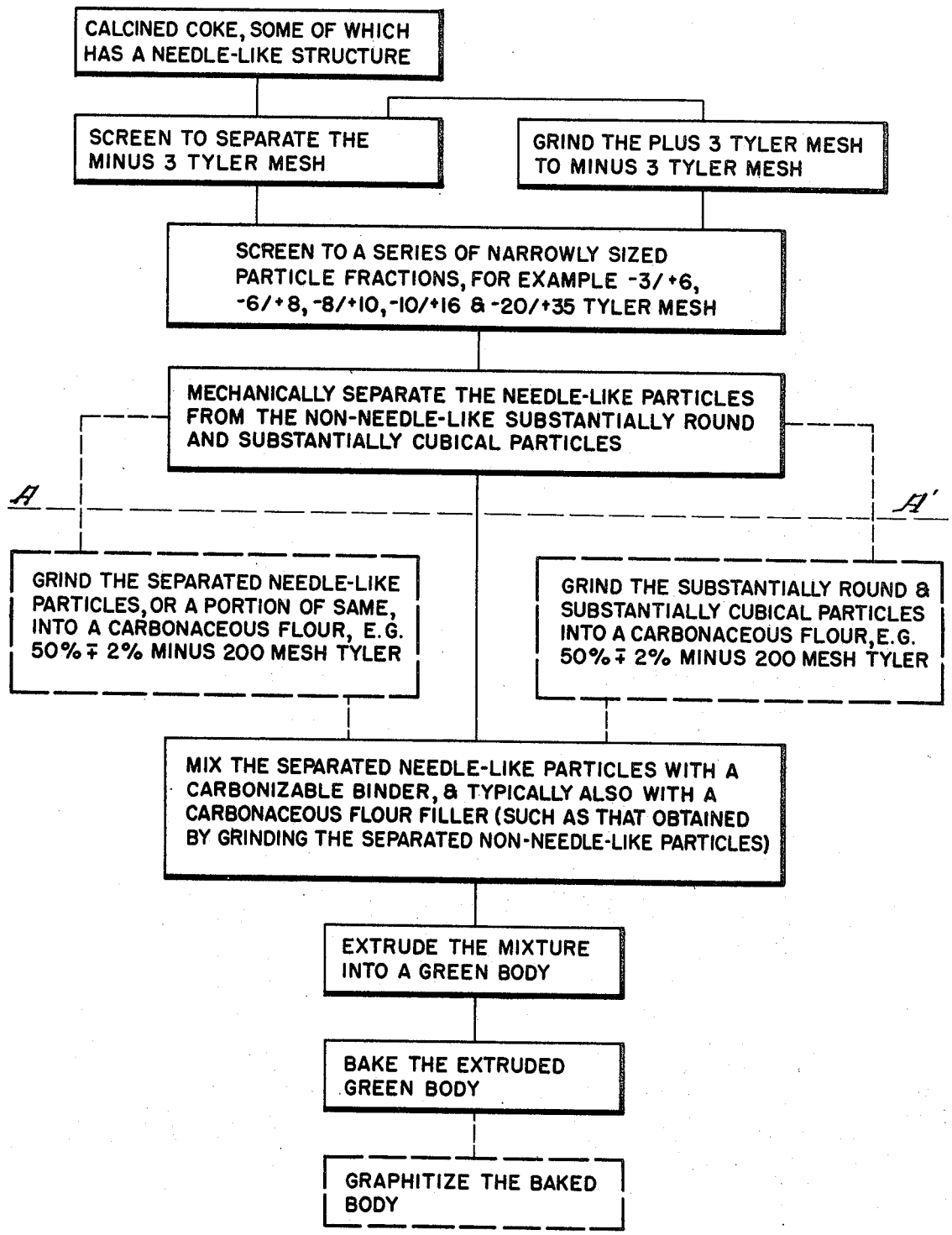

3,526,684
SEPARATION OF COKES INTO NEEDLE-LIKE AND NON-NEEDLE-LIKE PARTICLES AND THE PRODUCTION OF CARBON OR GRAPHITE BODIES
LeRoi E. Hutchings, Mount Prospect, Ill., assignor to Great Lakes Carbon Corporation, New York, N.Y., a corporation of Delaware
Filed Sept. 7, 1967, Ser. No. 666,170
Int. Cl. C01b *31/04*
U.S. Cl. 264—29
20 Claims

ABSTRACT OF THE DISCLOSURE

Calcined cokes, which contain fractions of needle-like and non-needle-like particles, are separated into two fractions each of which is more valuable for certain end uses than the original material.

Special carbon or graphite bodies having a high degree of anisotropy are produced by using carbonaceous particles in their production which are predominantly or exclusively "needle-like." The "needle-like" particles are obtained by mechanical separation from a starting material consisting of calcined coke particles, some of which are "needle-like" and the remainder of which possess other shapes, such as round, or cubical etc. After the "needle-like" particles are separated from the otherwise shaped calcined coke particles, they are mixed with a carbonizable binder and extruded. They are then either baked or graphitized depending upon the end product desired. The non-needle-like particles are particularly useful in the production of some types of anodes, some mold stocks and in the production of graphite articles for nuclear applications. They also are highly useful for the preparation of a carbonaceous flour along with the separated needle-like particles to make the carbon or graphite bodies having a high degree of anisotropy, because in grinding the non-needle-like particles a large amount of needle-like flour is generated.

BACKGROUND OF THE INVENTION

Field of the invention

This invention relates to a unique process for the separation of cokes into needle-like particles and into non-needle-like particles from calcined cokes which contain a fraction of each.

This invention also relates to a unique process for making carbon or graphite bodies. The invention relates most particularly to a novel method of making carbon or graphite bodies having a high degree of anisotropy, or low thermal expansion in the axial direction involving the alignment of needle-coke particles by extrusion or other forming techniques. Extruded carbon bodies having a high degree of anisotropy are particularly suitable in applications where conduction of electricity with minimum power losses is desired, e.g. in electrical furnaces and cells used in the metallurgical industries. Graphite bodies having a high degree of anisotropy are particularly useful as graphite electrodes for electric furnaces in the production of steel and other metals. In such use, electrode "trains" (viz a number of electrodes coupled to each other by means of threaded sockets and connecting nipples and mechanically suspended from the top of the furnace) are typically employed. It is important that the thermal expansion and resistivity of the individual electrodes in the "train" be kept as low as possible in the axial direction of the "train" in order to minimize power losses and mechanical problems. Graphite bodies having a high degree of anisotropy or low thermal expansion are also particularly suitable for use as the aforementioned "nipples."

Description of the prior art

The making of such carbon or graphite bodies or electrodes having a high degree of anisotropy in the axial direction and using needle-type calcined coke (e.g. coke from delayed coker raw petroleum coke) has already been described in the art, such as in U.S. Pat. 2,775,549. This patent also discusses the advantages of such electrodes, such as lower C.T.E. (coefficient of thermal expansion) and resistivity, as compared to electrodes made from amorphous petroleum coke. The subject matter of that patent, however, pertains solely to techniques for obtaining needle-like coke from a petroleum residuum. In order to obtain a high yield or high percentage of "needle-like" coke by *coking* a petroleum residuum, it is generally necessary to alter the operations at the oil refinery somewhat, with the result that extra processing is necessary, and/or lower gasoline and gas oil yields are obtained. Such extra processing and product losses, of course, increase the cost that the purchaser has to pay for the "needle-like" coke as compared to "regular" coke.

The terms "regular" and "needle-like" when used in the foregoing sense are meant to refer to the degree or percentage of "needle-like" structure or particles possessed by the coke and this is typically measured by the degree of anisotropy or the C.T.E. in the axial direction of graphite articles made from the coke. For example, graphite articles made from "needle-like" coke may typically possess a C.T.E. of 4 to $8 \times 10^{-7}$ inches/inch/°C., whereas those made from "regular" coke may typically possess a C.T.E. of 15 to $30 \times 10^{-7}$ inches/inch/°C., when measured over the same temperature range in the axial direction. The foregoing C.T.E. values and any that follow are the mean coefficients of thermal expansion measured over the temperature range of 20° C. to 100° C.

Some "regular" cokes are more anisotropic than others and graphite articles made from same may possess a C.T.E. of 10 to $12 \times 10^{-7}$ inches/inch/°C. rather than the aforesaid typical C.T.E. of 15 to $30 \times 10^{-7}$ inches/inch/°C. A coke yielding a graphite article with a C.T.E. between 10 and about $12 \times 10^{-7}$ inches/inch/°C. would not be considered a good "needle-like" coke if used for the purpose of making anisotropic graphite bodies and yet it is considerably better than a typical regular coke if used for such purposes.

SUMMARY OF THE INVENTION

It is a discovery of the present invention that it is possible to upgrade both "regular" cokes having a C.T.E. between about 10 and about $12 \times 10^{-7}$ and "needle-like" cokes into two fractions, each fraction being more valuable for certain purposes than the original starting coke material. This "upgrading" of the coke in the present invention is carried out by means of a *post-coking* and *post-calcining* mechanical operation wherein "needle-like" coke particles are separated from "non-needle-like" coke particles contained in a batch of calcined coke containing both types of particles. The invention is particularly applicable to and later exemplified by calcined coke derived from delayed coker raw petroleum coke. However, its principles may advantageously be applied to any anisotropic calcined coke (e.g. coke which contains "needle-like" particles) regardless of source. Such cokes also include coke made from purified coal tar residues and coke made from aromatic residues resulting from cracking petroleum fractions in petrochemical operations, e.g. residues from naphtha cracking to produce ethylene.

These mechanically separated "needle-like" coke particles are then used as part or all of the aggregate in the extrusion step of making anisotropic carbon or graphite bodies. This procedure and the advantages of same are founded upon the fact that some "regular" raw cokes, when calcined, possess a substantial degree of needle-like structure or percentage of needle-like particles, for example, typically from about 10% to about 20%. This is true regardless of whether the "regular" coke is "petroleum derived" or "coal tar derived" or "petrochemical operation derived."

This procedure of mechanical separation and the advantages of same are also applicable to the upgrading of "needle-like" cokes into even more "needle-like" or anisotropic cokes. For example, needle-like cokes yielding graphite products with a C.T.E. of between about 8 and about $4 \times 10^{-7}$ inches/inch/°C. contain between about 15% and about 70% of needle-like particles, the rest of particles being considered non-needle-like or substantially round and/or substantially cubical. By separating the needle-like particles from the non-needle-like particles the C.T.E.'s of the resultant graphite products can be lowered substantially.

It is known also that some needle-like raw cokes deteriorate during the calcination step because of agglomeration or fusion of the particles. The grinding and screening and separation steps employed in the processes of the present invention serve to counteract and overcome this disadvantageous phenomenon as compared to the processing techniques usually employed in making carbon or graphite articles from needle-like cokes.

It is an additional finding of the present invention that needle-like calcined coke particles may be efficiently and mechanically separated from the non-needle-like particles of some "regular" calcined cokes and that if carbon or graphite articles and electrodes are prepared from these separated particles, they will have properties comparable to or competitive with those previously made only from "needle-like" coke. In other words, it is a finding of the present invention that graphite articles and electrodes having superior properties may be prepared from some "regular" cokes by using an efficient, mechanical, post-coking procedure. The advantage of doing this will be apparent from remaining portions of the specification wherein the properties of graphitized electrodes obtained by following the teachings of the present invention are compared with the properties of graphitized electrodes produced from the same "regular," calcined coke starting material, but without employing such a "mechanical separation" procedure.

It is also a finding of the present invention that the properties of graphite articles and electrodes made from "needle-like" coke may be further improved with regard to C.T.E. and resistivity and other properties by first "upgrading" the "needle-like" coke into an "even more needle-like" or superior coke in accordance with procedures as described herein. The advantage of doing this will also become more apparent from remaining portions of the specification.

It is also a finding of the present invention that by means of techniques such as described herein several types of cokes such as previously described can be adjusted or processed to constant quality levels or to special quality grades. Such processing control is of importance, not only in the making of highly anisotropic electrodes from the needle-like coke, but also to the production of articles out of the non-needle-like coke such as for some types of anodes, some mold stocks, and nuclear applications, wherein the use of coke particles of non-needle-like structure are preferred. In other words, the process of the present invention is able to provide coke particles with controlled "needle-like" structure and/or coke particles with controlled "non-needle-like" structure.

BRIEF DESCRIPTION OF THE DRAWING

The process, in its essential steps, is illustrated in the accompanying block drawing. It should be appreciated that the process may be carried only as far as horizontal line A-A' if the product desired is the separated needle-like or non-needle-like coke, or if, for example the subsequent processing steps are not going to include an extrusion step. Peferably, however, the processing will involve the use of the separated needle-like particles in an extrusion step and then subsequent baking and graphitizing because of the utility and advantages derivable from carrying out this combination of steps. These include the production of baked and graphite electrodes of controlled and high anisotropy, which are conveniently produced on a practical and commercially competitive basis and which offer superior performance when in use such as in electrode trains in steel furnaces. Other variations of the process are described hereinafter or will be obvious to those skilled in the art.

DESCRIPTION OF THE PREFERRED EMBODIMENTS

The following examples are set forth to further illustrate the features of the invention and the advantages thereof.

EXAMPLE 1

A sample of calcined petroleum "needle" coke was made by coking a clean petroleum residuum in accordance with the procedures of U.S. Pat. 2,775,549. This coke was processed in a typical manner to make a graphite article, i.e. the coke was *sized*, mixed with a binder, extruded, baked and graphitized. The particle size of the coke used was as follows:

| No. of parts: | Size |
|---|---|
| 20 | $-3/+6$ (minus 3, plus 6 mesh Tyler screen). |
| 20 | $-10/+16$. |
| 20 | $-20/+35$. |
| 40 | "Flour" (50% $\mp$2% minus 200 mesh). |

One hundred parts of this coke was mixed with 27 parts of coal tar pitch binder having a melting point of 95° C. and was extruded into a cylindrical electrode shape with a diameter of 24 inches and a length of 6 feet. The electrode was then baked to a temperature of 950° C. and graphitized to a temperature of 2800° C. in the usual manner. The graphitized electrode possessed a longitudinal C.T.E. of $6.8 \times 10^{-7}$ (20–100° C.). However, when this "needle" coke was processed in accordance with procedures of the present invention, i.e. was ground and then screened to obtain two fractions, one $-6/+8$ Tyler mesh, and the other $-8/+10$ Tyler mesh, and these fractions were then cycled through a mechanical separator, the 30% yield of needle-like particles yielded graphite having a C.T.E. of $4 \times 10^{-7}$ (20–100° C.) when 60 parts of same were mixed with the same amount of carbonaceous flour and binder as was employed in the control, when extruded, baked, and graphitized under identical conditions as the control. The mechanical separator used was a Simon-Carter (Simon-Carter Co., 655–19th Ave. NE., Minneapolis 18, Minn.), No. 3 Uni-Flow Indented Cylinder Separator using a No. 13 Indent Cylinder. The 30% yield of needle-like particles obtained from the separator was the aggregate material used in the preparation of the electrode. Of the remaining 70% yield of "non-needle-like" particles from the starting petroleum coke, about one-third of same was further ground to a particle size of about 50% $\mp$2% minus 200 mesh Tyler and was used as the carbonaceous flour. (In grinding the non-needle-like particles to a flour a substantial amount of needle-like material was generated.) The remaining fraction of "non-needle-like" particles was employed for other purposes such as an aggregate in the production of mold stock or in electrodes for the production of aluminum. (In other words, and as previously indicated, the separated non-needle-like particles are not wasted or discarded, but rather may be used for several commercial purposes.)

The graphitized 24" electrode was pre-eminently suitable for use in an electrode train in an electric furnace for the production of steel because of its low C.T.E. and also because it possessed a lowered resistivity in the axial direction.

EXAMPLE 2

A sample of "regular" calcined petroleum coke when sized and processed as the control in Example 1 resulted in a graphite electrode having a C.T.E. of $12 \times 10^{-7}$ (20–100° C.). However, when this coke was ground, screened and cycled through a mechanical separator as in Example 1, a 13% yield of needle-like particles was obtained which, when used as the aggregate material in the preparation of an electrode as in Example 1, resulted in a graphite electrode product of $7 \times 10^{-7}$ (20–100° C.). As in Example 1, a fraction of the non-needle-like particles obtained after the separation step was ground into a flour and 40 parts of same were used as the filler (together with 60 parts of the separated needle-like particles) in the preparation of the electrode. The remaining non-needle-like material separated was employed for other purposes.

Also, as in Example 1, the electrode made by following the teachings of the present invention was much more suitable for electric furnace use than was the "control" electrode.

Other electrodes were made to demonstrate the effects of other processing variables. For example, some electrodes were made wherein a fraction of the yield of needle-like particles was ground and used as the "flour" material in making the electrodes (rather than a fraction of the separated non-needle-like particles as in Examples 1 and 2). The following table illustrates the results of these tests, as well as some additional processing variables, for the production of large (24-inch) and small (8 inch) diameter electrodes from both "needle" and "regular" coke starting materials.

| Ex. | Size electrode (inches, diameter) | Processing conditions, and type aggregate and/or filler | C.T.E. $\times 10^{-7}$ (20–100° C.) of finished graphite product | |
|---|---|---|---|---|
| | | | "Needle" coke | "Regular" coke |
| 3 | 24 | Unprocessed-control; no separation; particles and flour. | 7.2 | 12 |
| 4 | 24 | Separator used; part of needle yield ground into flour; needle particles and needle flour. | 3.8 | 6 |
| 5 | 24 | Separator used; part of non-needle yield ground into flour; needle particles and non-needle flour. | 4.8 | 8 |
| 6 | 8 | Unprocessed; no separation; all flour. | 6.5 | 11 |
| 7 | 8 | Separator used; needle yield ground into flour; separated needle flour. | 3.5 | 5.5 |
| 8 | 8 | Separator used; non-needle yield ground into flour; separated non-needle flour. | 7.0 | 12.5 |

In the foregoing examples of the table, the use of particles is normal for 24" electrodes and it would be impractical to use an all flour mix in making the large 24" electrodes because of the excessive binder requirements and difficulty of processing. Conversely, large size particles are not usually used in the preparation of small electrodes (e.g. 8" in diameter and under) and consequently all flour mix was used in making the 8 inch electrodes.

There are several ways or pieces of equipment or devices in which the previously discussed mechanical separation step can be carried out. Typically this step or these devices will depend for their operation upon the use of pockets which are sized and shaped to retain the non-needle-like particles of the calcined coke and to reject the needle-like particles when the pockets are subjected to rotation or vibration. Such "pocket separators" are well known to those skilled in the mechanical separation art and may be in cylindrical form or disc form or table form. If in cylindrical or disc form they depend upon rotation, and if in table form upon vibration, to effect the mechanical separation. A cylindrical separator which can be used is described in Example 1. A disc separator which can be used is the Simon-Carter Disc Separator, Size 2527–S. More than one or different types of separators may be used and can be stacked for parallel or series flow to facilitate rapid separation of differently sized coke fractions, or a single piece of equipment can be used with different settings made in same, if necessary, in order to separate screened fractions of different sizes.

The advantages of this invention are particularly notable when the procedures of same are applied to the making of extruded cylindrical graphite electrodes having a diameter of at least 8 inches and more specifically to electrodes which are of fairly large diameter (e.g. between about 16 and about 40 inches) and which are to be used in electric furnaces for the production of steel and wherein they are to carry high currents or subjected to high current densities. In making such electrodes a substantial percentage of the mix used is fairly coarse aggregate.

The process can be used to upgrade or improve any calcined coke starting material which contains a substantial percentage (for example, about 10 to about 70%) of needle-like particles, or to separate any such type coke mixture into two fractions, each of which might be more valuable than the original material. The process is not a substitute for the Shea process of U.S. Pat. 2,775,549 because by means of that process one can also obtain a graphtie product with a low C.T.E.; but the process of the present invention can be used or carried out in conjunction with the Shea process in order to obtain a better product, or a graphite product with a lower C.T.E. This is important, when the raw material fed into the Shea process is incapable of yielding a C.T.E. as low as desired.

The process of this invention also finds utility in making electrode connecting "nipples" which characteristically are made from cokes having as low as C.T.E. as, or lower than, the electrodes which they join together. The process is particularly important or advantageous in cases where, for example, one batch of calcined coke yields graphite products with a low C.T.E., e.g. $5 \times 10^{-7}$ inches/inch/° C. and another batch yields a graphite product with a higher C.T.E., e.g. $6.5 \times 10^{-7}$ inches/inch/° C. If nipples made from the latter coke are used with electrodes made from the former coke, this will result in uneven expansion and can cause joint loosening and/or joint splitting problems. The process of this invention, in such a case, can be used to upgrade the latter coke so as to produce nipples from same with axial or longitudinal C.T.E.'s nearer to or lower than the C.T.E.'s of the graphite products made from the former coke.

It is to be understood that the invention is not limited to the specific examples which have been offered merely as illustrative and that modifications may be made within the scope of the appended claims without departing from the spirit of the invention.

I claim:
1. A process for recovering calcined coke having a relatively high percentage of particles of needle-like structure from an initial mass of calcined coke having a lower percentage of particles of needle-like structure comprising:
(A) Grinding and screening the initial mass of calcined coke to a desired particle size within the range of minus 3 to plus 35 Tyler mesh; and
(B) Mechanically separating the needle-like particles present in the product of step A from the non-needle-like substantially round and substantially cubical particles from said step A by using a device whose operation depends upon the use of pockets sized and shaped to retain the non-needle-like particles and reject the needle-like particles when the pockets are subjected to rotation or vibration.

2. A process according to claim 1 wherein in step A the particles are screened to a series of narrowly sized fractions and wherein in step B the sized fractions from step A are individually mechanically separated into needle-like and non-needle-like particles.

3. A process according to claim 1 wherein the mechanical separation of step B is carried out by using a pocket separator in cylindrical form.

4. A process according to claim 1 wherein the mechanical separation of step B is carried out by using a pocket separator in disc form.

5. A process according to claim 1 wherein the mechanical separation of step B is carried out by using a pocket separator in table form.

6. A process of making a highly anisotropic carbon body which comprises:
(A) Grinding and screening calcined coke, some of which has a needle-like structure, to a desired particle size within the range of minus 3 to plus 35 Tyler mesh;
(B) Mechanically separating the needle-like particles present in the product of step A from the non-needle-like substantially round and substantially cubical particles from said step A by using a device whose operation depends upon the use of pockets sized and shaped to retain the non-needle-like particles and reject the needle-like particles when the pockets are subjected to rotation or vibration;
(C) Mixing the separated needle-like particles from step B with a carbonizable binder;
(D) Extruding the mixture of step C into a green body; and
(E) Baking the extruded green body from step D.

7. A process according to claim 6 wherein in step A the particles are screened to a series of narrowly sized fractions and wherein in step B the sized fractions from step A are individually mechanically separated into needle-like and non-needle-like particles.

8. A process according to claim 6 wherein a carbonaceous flour filler is mixed with the needle-like particles and carbonizable binder in step C.

9. A process according to claim 6 wherein the separated needle-like particles from step B are ground before being mixed with the carbonizable binder in step C and no separated particles are used as such in said step.

10. A process according to claim 8 wherein the carbonaceous flour filler is derived from grinding the separated non-needle-like particles obtained in step B of claim 10.

11. A process according to claim 8 wherein the carbonaceous flour filler is derived from grinding a portion of the separated needle-like particles obtained in step B of claim 10.

12. A process according to claim 6 wherein the extruded green body of step D is cylindrical and has a diameter of at least 8 inches.

13. A process according to claim 12 wherein the extruded green body has a diameter between about 16 and about 40 inches.

14. A process of making a highly anisotropic graphite body which comprises:
(A) Grinding and screening calcined coke, some of which has a needle-like structure, to a desired particle size within the range of minus 3 to 35 plus Tyler mesh;
(B) Mechanically separating the needle-like particles present in the product of step A from the non-needle-like substantially round and substantially cubical particles from said step A by using a device whose operation depends upon the use of pockets sized and shaped to retain the non-needle-like particles and reject the needle-like particles when the pockets are subjected to rotation or vibration;
(C) Mixing the separated needle-like particles from step B with a carbonizable binder;
(D) Extruding the mixture of step C into a green body;
(E) Baking the extruded green body from step D; and
(F) Graphitizing the baked body from step E.

15. A process according to claim 14 wherein in step A the particles are screened to a series of narrowly sized fractions and wherein in step B the sized fractions from step A are individually mechanically separated into needle-like and non-needle-like particles.

16. A process according to claim 14 wherein a carbonaceous flour filler is mixed with the needle-like particles and carbonizable binder in step C.

17. A process according to claim 14 wherein the separated needle-like particles from step B are ground before being mixed with the carbonizable binder in step C and no separated particles are used as such in said step.

18. A process according to claim 16 wherein the carbonaceous flour filler is derived from grinding the separated non-needle-like particles obtained in step B of claim 14.

19. A process according to claim 16 wherein the carbonaceous flour filler is derived from grinding a portion of the separated needle-like particles obtained in step B of claim 14.

20. A process according to claim 14 wherein the extruded green body of step D is cylindrical and has a diameter of at least 8 inches.

References Cited

UNITED STATES PATENTS

| | | | |
|---|---|---|---|
| 3,318,447 | 5/1967 | Ellingboe et al. | 209—213 |
| 3,326,796 | 6/1967 | Muller | 208—50 |
| 2,775,549 | 12/1956 | Shea | 208—52 |
| 2,922,755 | 1/1960 | Hackley | 208—106 X |
| 3,168,509 | 2/1965 | Juel | 264—29 X |
| 3,350,485 | 10/1967 | Shesler et al. | 264—105 |

EDWARD J. MEROS, Primary Examiner

U.S. Cl. X.R.

23—209.1; 241—24